Jan. 15, 1957 R. B. COTTON ET AL 2,777,653
EXPEDITIONARY AIRCRAFT ARRESTING SYSTEM
Filed May 13, 1955 8 Sheets-Sheet 5
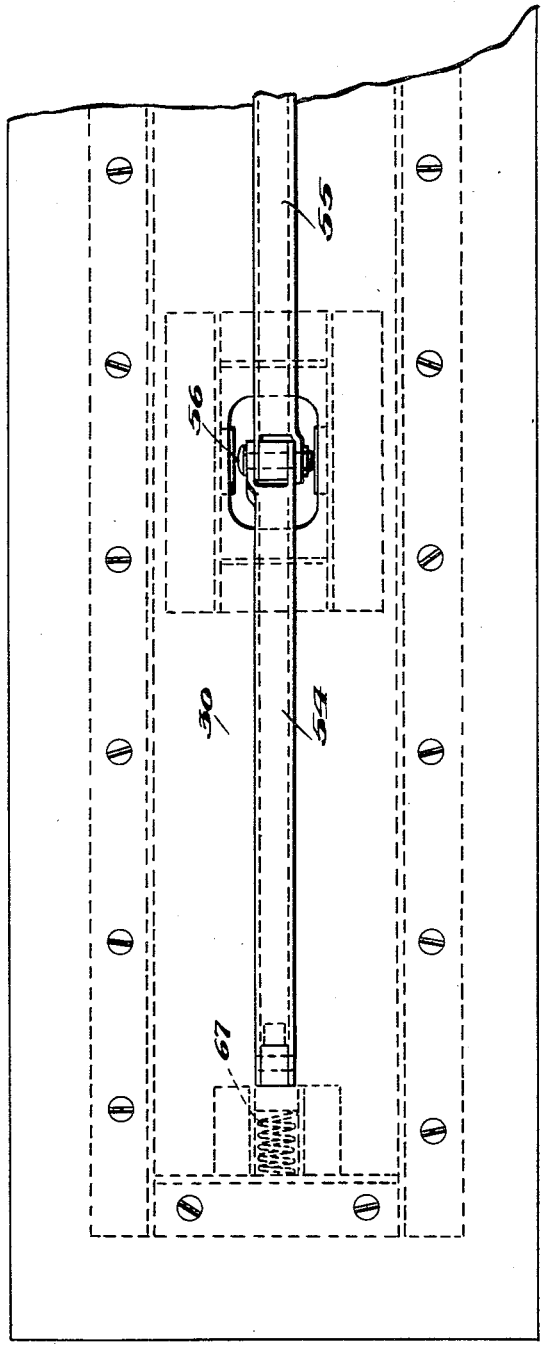
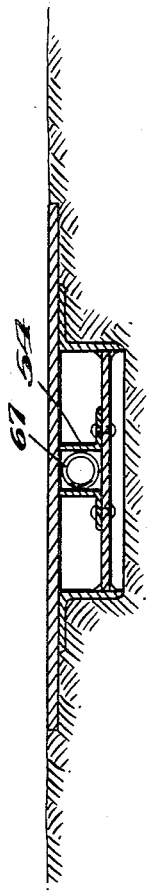
INVENTORS
ROBERT B. COTTON,
DONALD B. DOOLITTLE,
BY Herbert M. Birch
ATTORNEY

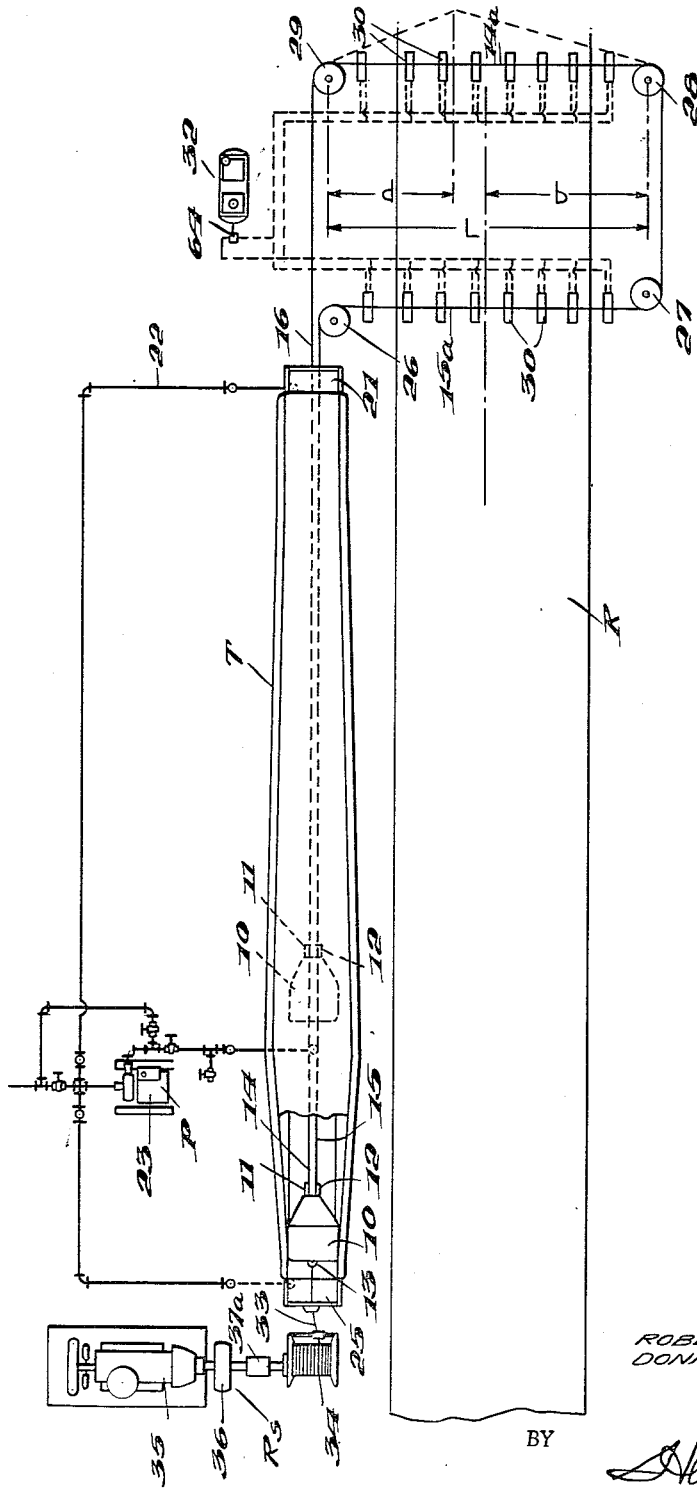

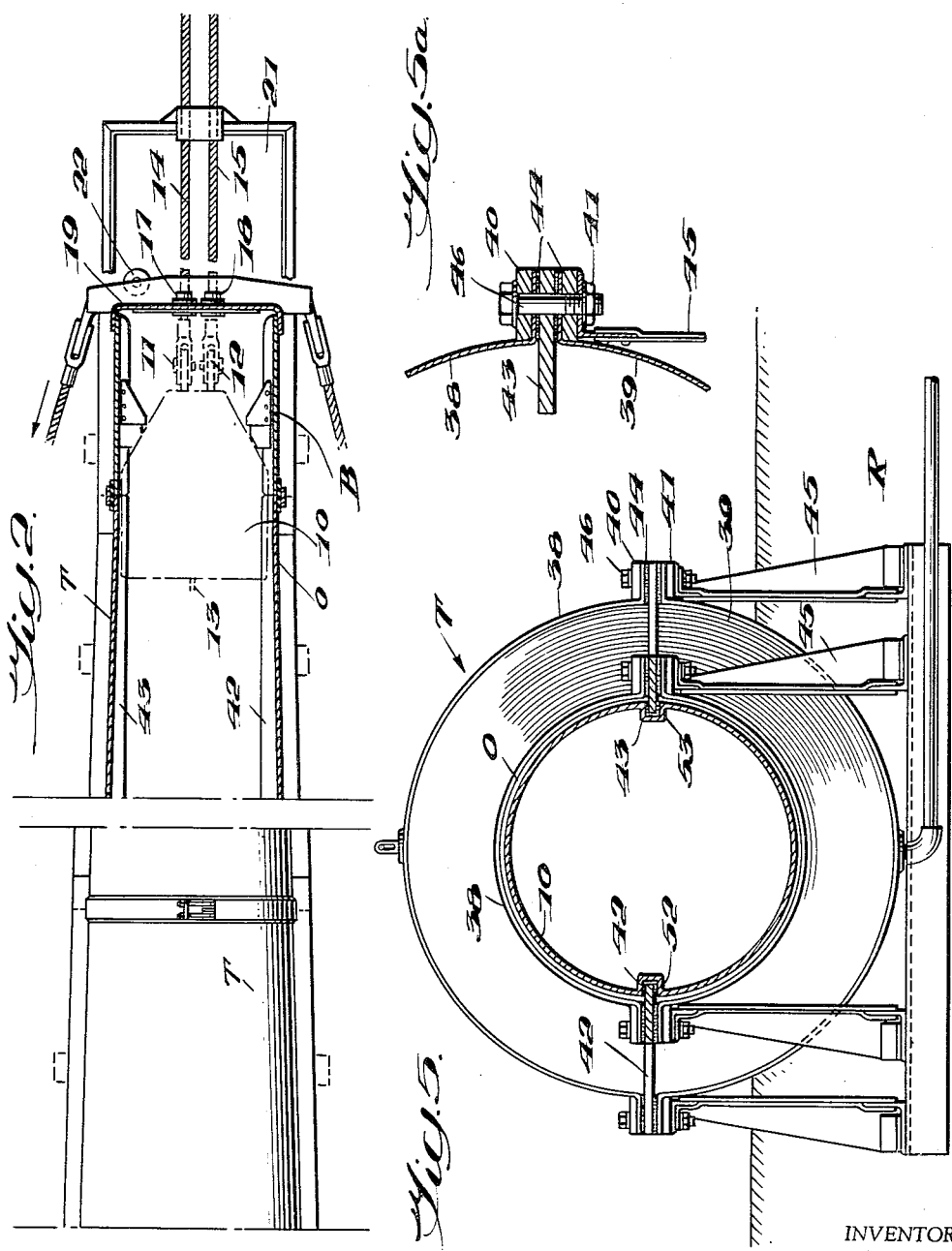

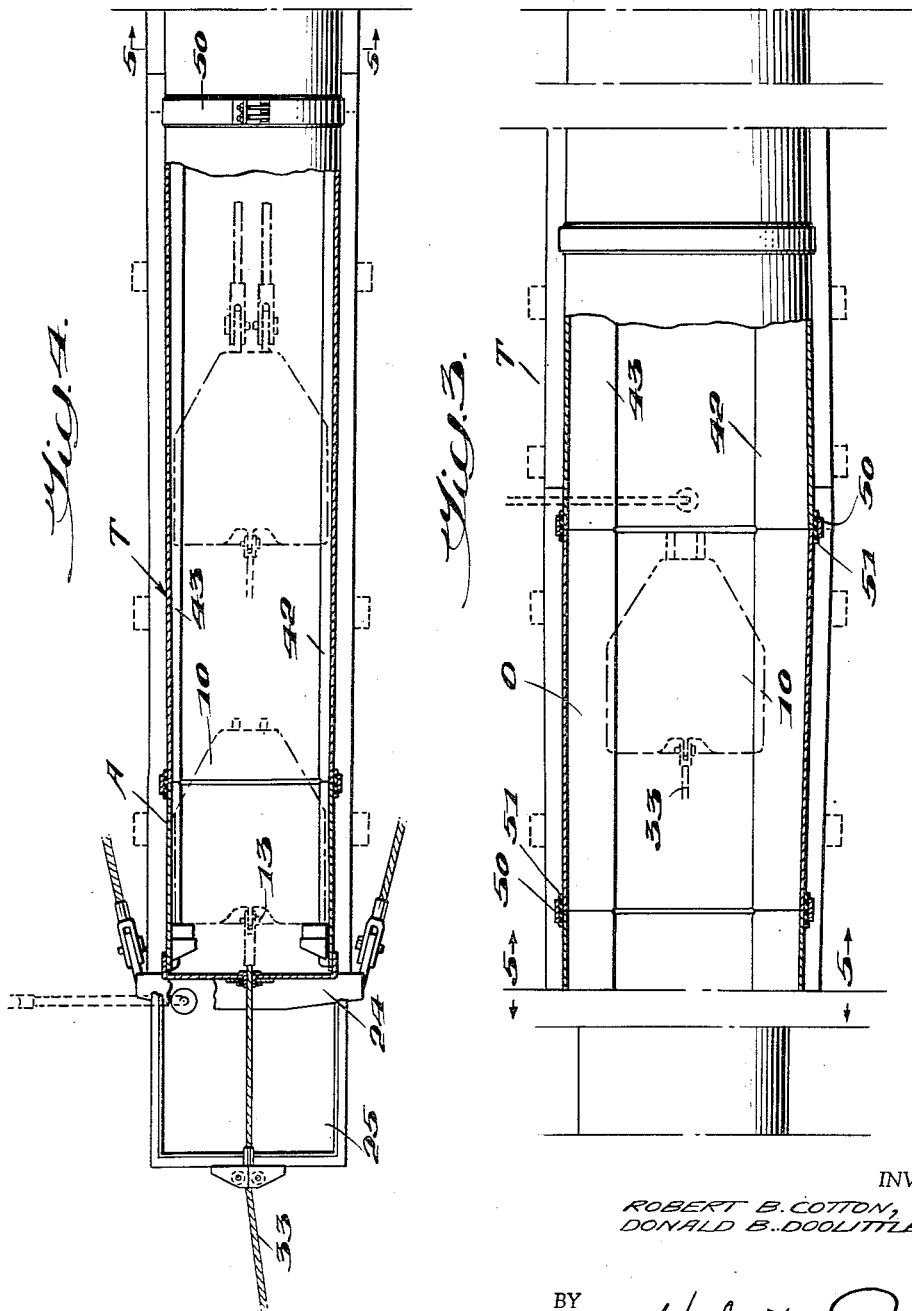

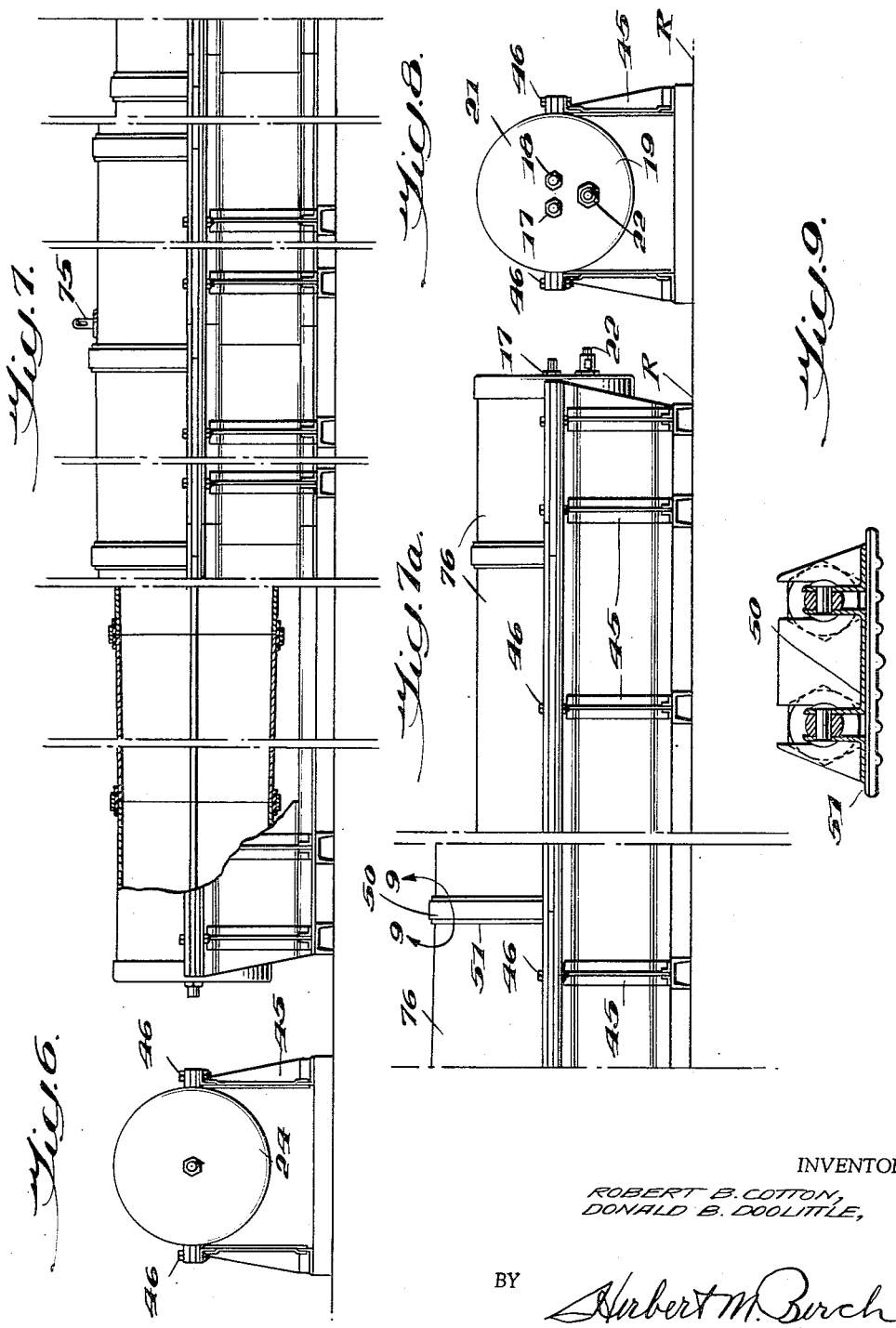

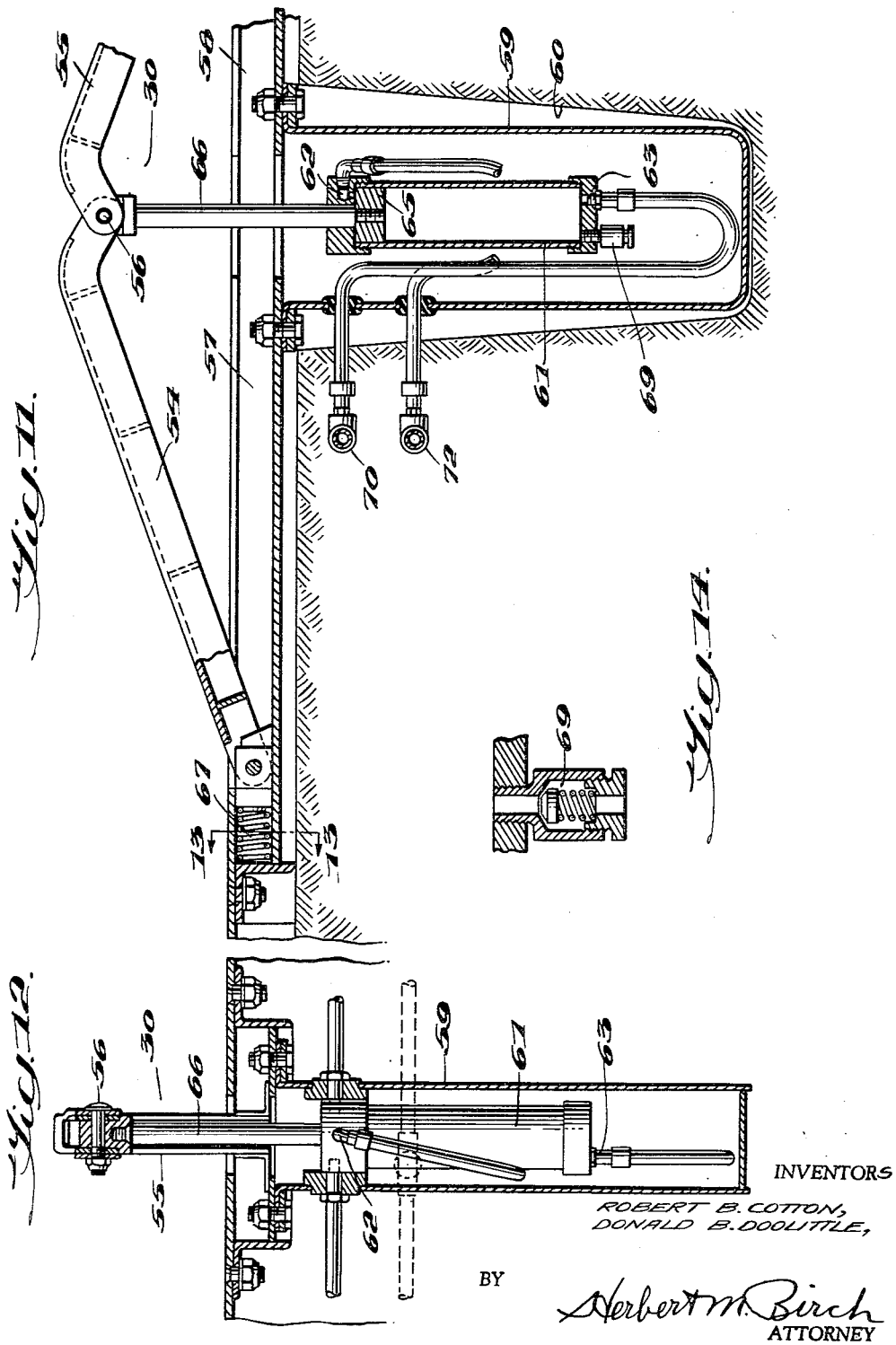

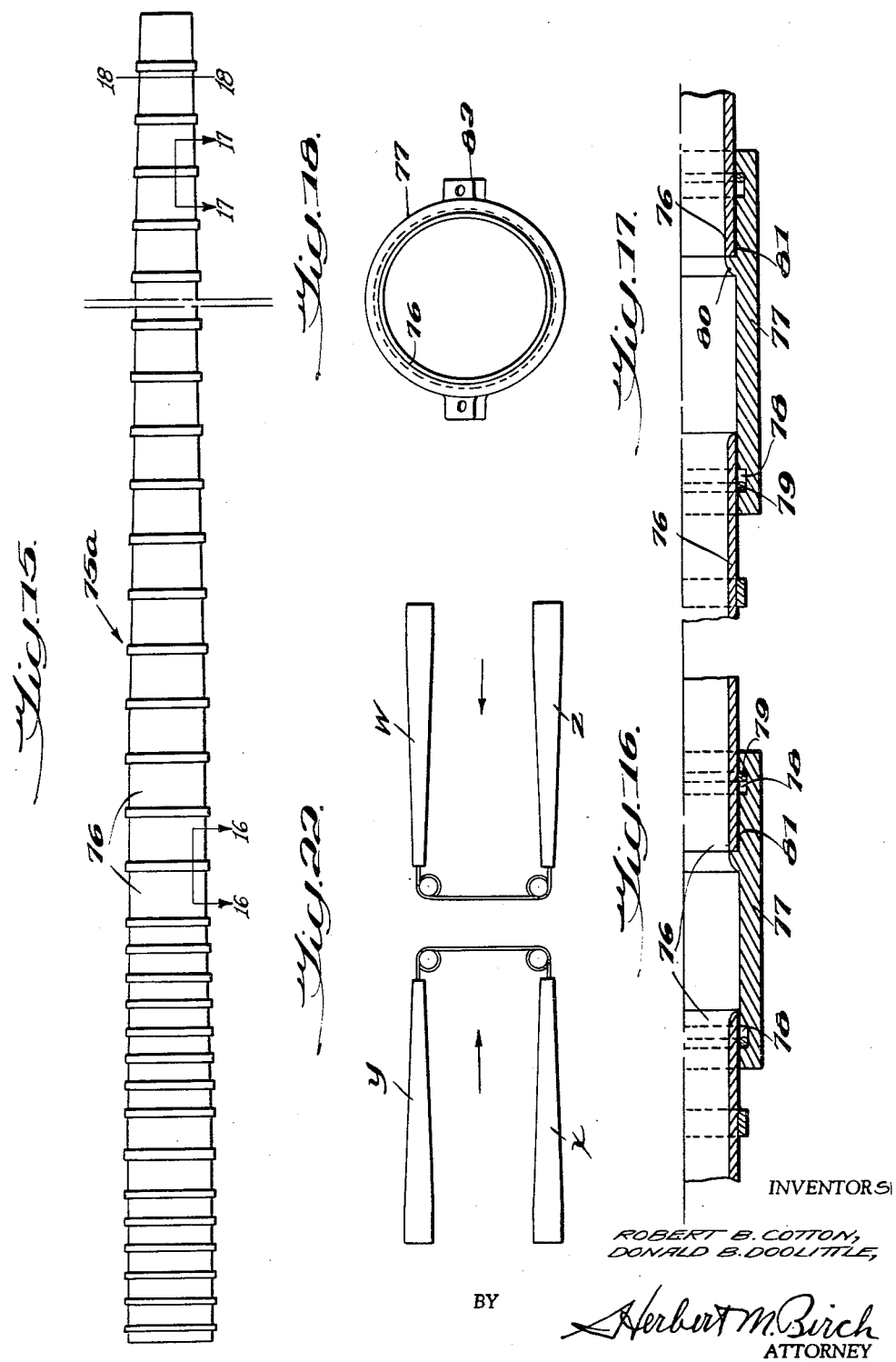

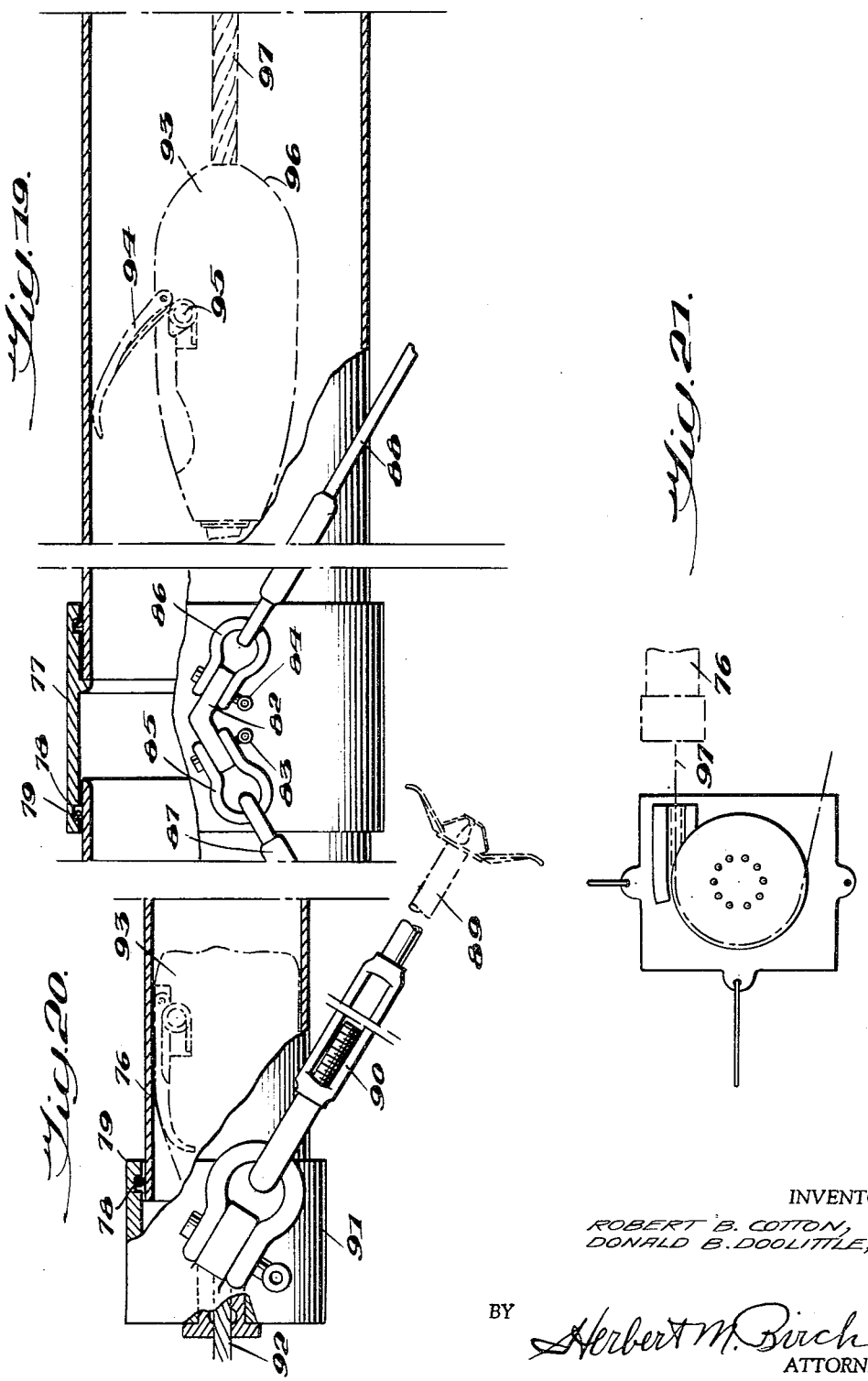

United States Patent Office 2,777,653
Patented Jan. 15, 1957

2,777,653

EXPEDITIONARY AIRCRAFT ARRESTING SYSTEM

Robert B. Cotton, Media, Pa., and Donald B. Doolittle, Wilmington, Del., assignors to All American Engineering Company, Wilmington, Del., a corporation of Delaware Application May 13, 1955, Serial No. 508,045

9 Claims. (Cl. 244—110)

This invention relates to an arresting gear for aircraft and is a continuation-in-part of prior co-pending application Serial Number 300,014, filed July 21, 1952, for Aircraft Arresting Means, now issued as Patent Number 2,731,219, also assigned to the present assignee.

It is an object of this invention to provide an arresting gear for expeditionary use wherein reliability of performance, weight and handling, time to produce, cost and ease of maintenance have been considered in its development as important basic features.

A further object of this invention is to eliminate the necessity of accelerating a large moving mass of liquid or bulk thereby permitting arrestments at aircraft engaging velocities of high speeds.

For example, to enable an arresting gear to operate at an airplane engaging velocity of for example, 130 knots, it is necessary to eliminate, or effectively reduce, the moving mass such as the crosshead, cable and hydraulic fluid from arresting engines as heretofore known.

The present novel arresting engine absorbs energy when a solid piston is pulled through a tube having a relatively larger bore filled with fluid. The hydraulic pressure which exists ahead of the piston is the velocity head required to move the fluid through the annular orifice between the piston and the walls of the bore of the tube. At any instant during an arrest, the only fluid in the tube having velocity is that fluid which is passing through the orifice, as the fluid ahead of and behind the piston is at rest. Thus, this energy absorber eliminates the acceleration of a large mass of fluid through an orifice or valve enabling it to operate at high engaging velocities.

This energy absorber, having hydraulic consistency and dependability, has a minimum number of moving parts; thus maintenance and ruggedness should be consistent with current equipment. The simplicity of design of components of the energy absorber and the small effect of minor tube diameter changes indicates that no close tolerances will be required in manufacturing.

A further specific object of this invention is to provide a tube with a predetermined taper of the interior bore thereof which is filled with fluid and which is traversed by a piston coupled to an arresting cable, the piston having a diameter smaller than the smallest portion of the tapered tube, thereby forming between the bore of the tube and the exterior of the piston an orifice of varying size according to the taper of the tube bore between which piston and tube bore the fluid is squeezed as the piston is pulled therethrough.

Another object is to provide means to maintain the tube filled with liquid in combination with means adapted to bleed out air entrapped in the tube.

Another object is to provide a plurality of consecutively numbered tapered tube sections adapted to be nested together for transportation to the site of operation prior to assembly as one continuous interiorly tapered arrest tube.

Still another object is to provide retractable arresting cable support means across the landing surface.

Yet another object is to provide a retrieving system for the arresting means.

With the foregoing and other objects in view, the present invention consists of certain novel features of construction, combination and arrangement of parts, as will now be more fully described and particularly defined in the appended claims.

In the drawings, wherein like parts are given like reference numerals and are thus identified throughout the following description:

Fig. 1 is a general schematic view of a runway with the present novel arrest mechanism mounted adjacent thereto for operation;

Fig. 2 is a cross section view of the arrest end of the novel tapered arrest tube;

Fig. 3 is a cross section view of part of the intermediate sections of the tapered arrest tube;

Fig. 4 is a cross section view of the retrieving end of the arrest tube sections;

Fig. 5 is a partial cross section view on line 5—5 of Figures 3 and 4, looking in the bore of the tube toward the arrest end;

Fig. 5a is an enlarged section of the half-section connections for each tube element;

Fig. 6 is an end view of the retrieving end of the tube with the sump removed for clarity;

Fig. 7 is a side elevational view of the arrest tube and its mountings broken away to conserve space;

Fig. 7a is a continuation of the side view of Fig. 7 at its progressively larger tapered part to the smaller arrest end;

Fig. 8 is an end view of the arresting end of the tube with the sump removed for clarity;

Fig. 9 is an enlarged cross sectional view on curved section line 9—9 of Fig. 7a;

Fig. 10 is a top plan view of a cable support;

Fig. 11 is a front side elevational view of a cable support in up position;

Fig. 12 is a side elevational view of the cable support of Fig. 11 in up position;

Fig. 13 is a cross section view on line 13—13 of Fig. 11;

Fig. 14 is an enlarged detail of the cable support relief valve structure;

Fig. 15 is a side elevational view of another form of tapered arrest tube;

Fig. 16 is an enlarged detail taken on section line 16—16 of Fig. 15;

Fig. 17 is an enlarged detail taken on section line 17—17 of Fig. 15;

Fig. 18 is a detail taken on section line 18—18 of Fig. 15;

Fig. 19 is a transverse cut-through a longitudinal cross section view of the arrest tube and novel coupling means for the several stepped sections thereof;

Fig. 20 is a detail of the retrieving end and anchor means therefor;

Fig. 21 is a top plan of one of the cable sheaves at the arrest end of the tube.

Fig. 22 is a top plan view of a schematic arrangement using duplicate arrest tube sets positioned in opposite directions for aircraft arrestment in either direction.

Referring to the drawings and first with particular reference to Fig. 1, there is illustrated a schematic illustration of a complete lay-out of the present invention comprising a runway R having mounted adjacent thereto a plurality of tubular sections connected together to form a tube T with an elongated bore, a water supply pump P with a supply line into the bore and a retrieving system RS. Within the bore is positioned a piston 10, which at its leading end includes two coupling members 11 and 12 and its trailing end a third coupling member 13. The coupling members 11 and 12 are each respectively connected to cable ends 14 and 15 of an arrest cable 16. This cable 16 extends in a continuous loop from couplers 11 and 12 and from the forward end of the tapered bore through split brass bushings 17 and 18 respectively formed in an end cap 19, which fits over the end of the head-tube section at the arresting end and fluid seals the interior bore. Extending beyond the end cap 19 and surrounding its connection with the tubular section is a sump 21. This sump serves as a trap to collect any fluid leaking out at the cap and a return line 22 leads off from the sump to the return side of a centrifugal water pump P for reuse of the water. The tail end of the connected section of tubing is likewise closed off and sealed by an end cap 24 and includes a sump 25 for the purpose of collecting leakage. This sump also includes a return line to the centrifugal pump P for such fluid. The cable 16 as it extends from the sump 21 is arranged in two parallel strands which are a continuation of the hereinbefore mentioned ends 14 and 15 of the cable loop. For example, strand 15 is reeved around a sheave 26 and extends across the runway R and reeves around a sheave 27 on the opposite side of the runway and forwardly along the side edge thereof and around a sheave 28 from where it extends across the runway R in spaced parallel relation to the first strand or cable between sheaves 26 and 27. This last span of cable in turn reeves around a sheave 29 adjacent to the opposite side of the runway from sheave 27 and extends rearwardly toward the sheave 26 and into connection with the piston 10 by means of coupling 11 thus forming the cable end 14 heretofore referred to.

Thus there are provided transverse the runway R two spaced apart parallel arresting pendants 14A and 15A for engagement with the arresting hook of an aircraft as is generally well known in the art. Each of these pendants are supported by hydraulic cable supports 30 as shown in detail in Figures 10, 11 and 12, each of the cable supports may be raised or lowered with respect to the surface of runway R by means of fluid motors such as pistons and cylinders arranged in series from a manifold connection with an air compressor 32 or the like mounted on one side of the runway.

An additional cable 33 is provided for retrieving the piston 10 to battery position after an arrest is made. This cable 33 connects to the piston coupling 13 and extends rearwardly through the tail end cap member 24 and its associated sump 25 to the retrieving drum 34, which is driven by any suitable power device such as a gas engine 35 and its associated driving connections which may include a torque converter 36 and a friction clutch 37. Thus the parts required to make an arrest, consist only of two elements, namely, the piston 10 and the cable 16 which is reeved in the manner above described around the base anchored runway sheaves 26, 27, 28, and 29. The fluid, which fills the interior bore of the connected sections is normally stagnant and it is through this body of fluid the arrest piston is dragged by cable 10. As shown in Figure 2, the piston 10 has an exterior circumference which is relatively smaller than the interior circumference of the elongated bore formed by the connected sections of tubing, whereby an annular orifice O between the piston and the bore is formed. This orifice varies in size according to the bore taper. The tubing sections are each consecutively numbered, so that when they are coupled together they form the extended bore in which the piston 10 travels and so that they will form a predetermined taper adapted to co-act with the piston in a manner such as to develop the necessary deceleration orifice O for the arrest of an aircraft engaging one of the deck pendants 14A or 15A. The tapered sections of tubing may be arranged in a straight tapered bore gradually converging from the tail or retrieving end of the elongated bore to the head or the arrest end thereof or as illustrated in Fig. 1, the tube sections may be of smaller taper at the tail end of the bore and gradually taper outwardly for an intermediate distance and then gradually taper inwardly until capped by the end head cap 21.

STRUCTURAL FORMATION OF TUBE SECTIONS

The tube sections are consecutively numbered in the order of their connection to provide the desired taper for the interior bore. There may be as many as thirty-six sections more or less each with varying internally tapered bores. For example, see the following table for illustration of one probable taper formation like Figure 1 and the detailed views, Figures 7 and 7a:

*Tube Dimensions*

| Tube Section No. | A Inside Dia. | B Inside Dia. | C Length | Remarks |
| --- | --- | --- | --- | --- |
| 1 | 18.40 | 20.98 | 24.00 | Retrieving End. |
| 2 | 20.98 | 24.14 | 84.00 | |
| 3 | 24.14 | 26.58 | 36.00 | |
| 4 | 26.58 | 27.65 | 48.00 | |
| 5 | 27.65 | 28.85 | 84.00 | |
| 6 | 28.85 | 29.76 | 84.00 | |
| 7 | 29.76 | 30.36 | 84.00 | |
| 8 | 30.36 | 30.68 | 84.00 | |
| 9 | 30.68 | 30.86 | 84.00 | |
| 10 | 30.86 | 30.90 | 36.00 | |
| 11 | 30.90 | 30.84 | 48.00 | |
| 12 | 30.84 | 30.74 | 84.00 | |
| 13 | 30.74 | 30.48 | 84.00 | |
| 14 | 30.48 | 30.20 | 84.00 | |
| 15 | 30.20 | 29.90 | 84.00 | |
| 16 | 29.90 | 29.80 | 84.00 | |
| 17 | 29.80 | 29.68 | 84.00 | |
| 18 | 29.68 | 29.52 | 84.00 | |
| 19 | 29.52 | 29.32 | 84.00 | |
| 20 | 29.32 | 29.08 | 84.00 | |
| 21 | 29.08 | 28.86 | 84.00 | |
| 22 | 28.86 | 28.58 | 84.00 | |
| 23 | 28.58 | 28.26 | 84.00 | |
| 24 | 28.26 | 27.92 | 84.00 | |
| 25 | 27.92 | 27.52 | 84.00 | |
| 26 | 27.52 | 27.14 | 84.00 | |
| 27 | 27.14 | 26.62 | 84.00 | |
| 28 | 26.62 | 26.08 | 84.00 | |
| 29 | 26.08 | 23.90 | 84.00 | |
| 30 | 23.90 | 22.84 | 84.00 | |
| 31 | 22.84 | 22.00 | 84.00 | |
| 32 | 22.00 | 21.04 | 84.00 | |
| 33 | 21.04 | 20.44 | 84.00 | |
| 34 | 20.44 | 20.44 | 84.00 | Constant Dia. |
| 35 | 20.44 | 20.44 | 84.00 | Do. |
| 36 | 20.44 | 20.44 | 24.00 | Arresting End |

The above table in the first column from left to right is for tube section Number 1, which at the retrieving end A has an inside diameter of 18.40 inches and at the arresting end B an inside diameter of 20.98 inches. This end of the overall tube design gradually tapers into an enlarged bore, until tube section Number 11 is reached. This tube section 11 at the retrieving end A has an inside diameter of 30.90 inches and a smaller inside diameter of 30.84 inches, section 12 has an inside diameter of 30.84 at retrieving end A and an inside diameter of 30.74 at arresting end B and so on into a progressively smaller and smaller tapered bore, until sections 34, 35 and 36 are reached at the final arresting end of the completely assembled tube T. This table of dimensions results in the tapered design illustrated schematically in Fig. 1. In the table "C" represents the lengths of each of the thirty-six tube sections.

Fabrication of the tube sections and their transportability determines the section lengths required and the dimensions of the tube sections which are tabulated in the above table are determined from a graphical plot of the radii of the tube sections with modification to include the piston guide rails. Also, a relationship to first determine the tube diameters required at various stations was developed by calculations based on the following references, namely:

$Ma$ = aircraft mass
$Va$ = velocity of aircraft
$Vp$ = velocity of piston
$Vw$ = velocity of water through orifice
$Ap$ & $rp$ = piston area and radius
$At$ & $rt$ = tube (inside) area and radius
$Ao = At - Ap$ = area of orifice
$P$ = hydraulic pressure ahead of piston
$D = p \times Ap$ = piston drag Thus with this relationship, knowing the weight of the aircraft, its engaging velocity and the desired constant cable tension, the taper shape of the tube for the energy absorbing means 10 can be definitely determined. For example:

$$\frac{MaV^2Ao}{2} - \frac{MaV^2As}{2} = pApX$$

But $$Va = \frac{Vp}{\text{sine}}$$

$$\therefore \frac{MaVa^2o}{2} - \frac{Ma}{2}\left(\frac{Vp}{\text{sine}}\right)^2 = pApX$$

But $$\text{Sine} = \frac{S}{b+x}$$

$$\therefore \frac{MaVa^2o}{2} - \frac{MaV^2p}{2}\left(\frac{b+x}{s}\right)^2 = pApX$$

and $$Q = ApVp = AoVw$$
$$\Pi rp^2 Vp = \Pi(r_t^2 - r_p^2)Vw$$
$$Vp = Vw\frac{(r_t^2 - r_p^2)}{r_p^2}$$

and $$Vw = \sqrt{2gh} = \sqrt{\frac{2gp}{0.433}} = 12.2\sqrt{P}$$

Thus:

$$Vp = \frac{12.2\sqrt{P}(r_t^2 - r_p^2)}{r_p^2}$$

$$\therefore \frac{MaVa^2o}{2} - \frac{Ma}{2}\frac{(b+x)^2}{s}\left[\frac{12.2\sqrt{P}(r_t^2 - r_p^2)^2}{V_p^2}\right]PapX$$

$$\left[\frac{12.2\sqrt{P}(r_t^2 - r_p^2)}{r_p^2}\right]^2 = \frac{2S^2}{Ma(b+x)^2}\left[\frac{MaV^2Ao}{2} - PApX\right]$$

$$12.2\sqrt{P}(r_t)^2 = \frac{\sqrt{2S^2}}{Ma(b+x)^2}\left[\frac{MaV^2Ao}{2} - PapX\right] + 12.2\sqrt{P}$$

But $$S = \sqrt{LX + X^2} \text{ and } pAp = D$$

$$r_t^2 = \frac{r_p^2}{12.2\sqrt{P}}\sqrt{\frac{2(LX+X^2)}{Ma(b+x)^2}\left[\frac{MaV^2Ao}{2} - Dx\right]} + r_p^2$$

$$r_t = r_p\sqrt{\frac{0.082}{\sqrt{P}}\frac{\sqrt{LX+X^2}}{b+x}\sqrt{V^2Ao - \frac{2DX}{MA}} + 1}$$

Each tube section is composed of two flanged semi-circular members 38 and 39, preferably made of stainless steel, along with stainless steel doublers 40 and 41. The flanges are secured by bolts 46 to diametrically opposite stainless steel piston guide rails 42 and 43, respectively. Neoprene gaskets 44 are used between the tube flanges and the guide rails to prevent fluid leakage from within the bore of the tube. The several sections of tube, are supported respectively from a base adjacent runway R by means of suitable aluminum fabrications 45, which are fastened by means, such as the bolts 46 to the tube flanges and to bore members, such as aluminum channels 47. Each of these tube sections are shop assembled and are transported to the site of operations as finished units, see Fig. 5.

Assembly of the arresting mechanism is accomplished by placing the numbered tube sections in the proper sequence for a predetermined bore taper and connecting them with steel bands 50 to which are joined extruded neoprene gaskets 51. These steel bands or strap members are not structural members but are used only to seal the joints between each of the respective adjacent tube sections.

The piston guide rails 42 and 43 hereinbefore referred to are lapped externally at each tube joint and bolted into place and cooperating with the guide rails on each side of the piston are slippers 52 and 53, which slippers are of a material which when lubricated with water provide a free sliding connection along the guide rails, see Fig. 5.

CABLE SUPPORT

The cable supports 30 are especially mounted to meet certain requirements of operation. For example, the cable pendants 14ª and 15ª should be so suspended that no portion therof is below a predetermined distance such as 2¼ inches or above a predetermined distance such as 6 inches from the runway R. The supports should be capable of simple removal or being locked down to allow the arresting cable to be essentially flat on a runway when the arresting system is not in use. The support should be capable of yielding and returning to position under the impact force of a landing aircraft wheel without damage to either the wheel or the support. The support should be so shaped as to allow the cable to position itself automatically during the retracting operation. The cable support also must function properly under the prescribed operating weather conditions. The members 54 and 55 which comprise a cable support 30 are joined by a pivot pin 56 at one end while the other end of each respective member move horizontally in a respective guideway 57 or 58 along a common center line. Each cable support 30 includes a housing 59 sunk below the runway level in a pit 60 and in the housing is mounted a cylinder 61 having inlet and outlet ports 62 and 63 at each end, which ports connect a source of air pressure through a four-way valve 64. Within the cylinder is a piston 65 to which is connected a piston rod 66 which extends upward above the runway when the piston is in its uppermost position and attaches to the respective pivoted ends of the said support members 54 and 55. The piston 65 is capable of raising and lowering said cable support members 54 and 55 when air pressure is applied in the proper direction, see Figs. 10, 11 and 12. To improve the action of the cable support members each end of the guideway houses a respective coiled cushion spring 67, which yieldably resist the sliding movement of the respective oppositely positioned ends of the cable support members 54 and 55 when the piston 65 is moved downwardly into the cylinder 61, to thereby lower the cable support members 54 and 55 to inactive position.

The operation of each of the cable supports 30 is such that when the wheel of a landing aircraft strikes one of the yielding members 54 or 55 thereof it yields, and in so doing causes the air in the piston cylinder to be compressed. A relief valve 69 is located in the lower head of the cylinder to prevent a pressure surge in the air supply manifolds or headers 70 and 72, see Figures 11 and 14. Because of the connection of the piston rod about the pin 56 and the pivotal connection for the cable support members 54 and 55 about the same pin, the air cylinder is pivoted at the upper head and this will provide less resistance to contacts by the wheels of an aircraft and avoid possible landing difficulties because of the arcuate movement thus permitted. When the controls from the air compressor to the cable supports are set in the upper position the cable support returns to the upper position upon contact with an aircraft wheel since full operating air pressure through the control valve still acts on the piston. The only operating control for each deck pendant required is any suitable type of four-way air valve such as shown at 64. This valve will be lever operated and marked for two positions, "Up" and "Down." Accordingly, when the arresting piston 10 is in battery position and preparations are being made to receive an aircraft the air valve 64 for each pendant will be moved to the upper position causing the pistons 65 to move the cable pendants 14A or 15A and their respective cable support 30 into position. After the aircraft has been brought to rest the cable support 30 may be lowered by moving the valve for each respective pendant to the down position and the support will remain down as long as the air pressure is released from the respective cylinders thereof.

RETRIEVING SYSTEM

After an arrest has been made it is desirable to retrieve the arrest piston and return it to battery position. To accomplish this restoration the engine 35 is started and through the torque converter 36 and the friction clutch 37 a suitable driving rotation is imparted to the retrieving drum 34 shown in Figure 1. Around the retrieving drum is wound the hereinabove referred to retrieving cable 33, which connects to the retrieving side of the piston 10 by the coupling 13, thus rotation in a clockwise direction of the drum winds up the cable and restores the piston to battery position.

OPERATION

With the piston 10 in battery position at the retrieving end of the tube T and the arresting cable payed out around the runway sheaves 16 to provide the cross runway pendant means 14A and 15A, and the tube T filled with liquid, the system is ready for aircraft arrestment. Preferably the cable length is such that when the piston is completely returned by the retrieving mechanism there is a sufficient tension on the cable to eliminate any slack, and the pendant means are stretched across the runway surface over their respective series of cable supports 30.

The cable supports are raised from "down" position to "up" position by moving the lever of the air control valve accordingly, and the pendants 14A and 15A are held raised to a predetermined position for the most desirable height for engagement with the landing hook of an aircraft to be arrested. In filling the tube T with water by the supply pump, it may be advisable to bleed off any air trapped in the tube by opening a bleed valve 75 mounted in the tube wall of one or more sections, see Fig. 7.

When the solid piston 10 is pulled from battery position at the retrieving end of the tube by a landing aircraft engaged with one of the runway pendants, it absorbs energy. The only movement of liquid in the tube is the liquid passing through the orifice O defined by the exterior of the piston and the interior tapered bore of the tube, as the liquid ahead of and behind the piston is at rest. A progressively smaller orifice and greater absorbing of energy is produced as the piston 10 travels to the arrest end of the progressively smaller tapered bore of the tube T, until a complete arrestment of the aircraft.

Other forms of tapered tube may be developed and also various forms of arrest pistons used in combination therewith. For example, in Figures 15 through 21, there is illustrated a tapered arrest tube 25 formed of stepped tube sections 76 of various lengths with a substantially smooth bore and without a piston guide track. Each adjacent section is coupled together with an annular pipe coupling 77, such as an aluminum casting formed with an annular O-ring groove 78 in the internal bore thereof adjacent each end for an O-ring 79 and an off-center annular abutment or stop rib 80 around the coupling bore. The coupling rib 80 abuts the peripheral rim 81 of one section of tube 76 in the coupling bore, while the end of the adjacent tube section is frictionally fitted into the coupling bore and sealed fluid tight therein by the O-rings 79, see Figures 16, 17 and 19. Each coupling is preferably formed with a V-shaped ground anchor lug 82 formed with openings to receive coupling pins 83 and 84 for anchor couplings 85 and 86 connected to cables 87 and 88 and such as adjustable ground anchor 89 with a turnbuckle 90, shown in Figure 20.

In Figure 20 is shown an end cap 91 and a small section of the retrieving cable 92 coupled to the tail end of an arrest piston 93, see Figures 19 and 20. This piston is formed with guide arms 94 biased outwardly from the piston body by spring means 95 into contact with the smooth bore of the various stepped tapered tube sections 76. The nose 96 of the piston 93 is coupled to an arrest cable 97, which as it leaves the tube ends may be extended across a runway or landing surface and connect with a second duplicate arrest piston in a duplicate arrest tube extending longitudinally along the opposite side of the landing surface from the first tube, see Figure 22.

In this latter Figure 22 the duplicate arrest tube sets X—Y and Z—W are shown in longitudinally spaced opposite directions, whereby arrests from either direction may be made, as indicated by the arrows in the figure.

The operation of these additional forms of the invention is basically the same as described in connection with the first form of the device and the stepped-formation of the arrest tubes $75^a$ is preferable in some instances for the sake of economy.

Thus there is provided a novel energy absorber system for aircraft arrestment, whereby there is elimination of acceleration of a large mass of liquid or other mediums through a valve, which enables this system to operate at higher engaging velocities than heretofore with a large moving mass of liquid.

Following the arrest, the retrieving engine in each form of system when operated will again return the arrest piston to battery position and the cable supports may be retracted, until the next arrest is to be made.

While only three specific embodiments of the invention are hereinbefore set forth, it is to be expressly understood that the same is not to be limited to the exact taper formations or construction and arrangement of the parts as illustrated and described because various modifications may be developed in putting the invention into practice within the scope of the appended claims.

What is claimed is:

1. Means for arresting aircraft traversing a runway surface comprising a sealed elongated liquid filled tube with a bore tapered in the arresting direction, an arresting piston in said tapered bore, said piston having an outside diameter less than said bore, an aircraft arresting cable loop coupled at each free end of the loop to the said piston and extending therefrom through the arresting end of the tube, said loop being reeved around a pair of spaced apart runway sheaves on each side of the runway surface, to thereby form a pair of longitudinally spaced apart runway pendants across the runway, either of said pendants when hooked by an aircraft landing on the runway imparting an accelerating pull on said piston, whereby the piston is pulled through said liquid in the tapered bore of the tube, and a portion of the liquid is squeezed between said outer diameter of said piston and the adjacently surrounding tapered bore without accelerating the mass of said liquid as said piston is pulled toward the tapered arresting end of the tube.

2. Means for arresting aircraft on a landing surface comprising an arrest cable extending across said landing surface, said cable being reeved around sheaves supported for rotation on each respective side of said landing surface, a plurality of tube sections coupled together in end to end relation forming an elongated interior bore, each of said sections being tapered into a progressively smaller bore and each end tube section being closed and fluid tight, said interior bore being filled with fluid, a piston in said bore, said cable being coupled to said piston, said piston being smaller in circumference than the smallest portion of the interior bore and guide means carried by the piston engaging the walls of the said bore, said piston being pulled through the fluid in the progressively tapered tube sections by an aircraft engaging the cable across the landing surface for deceleration of the said aircraft on the landing surface.

3. An aircraft arresting means comprising an arresting cable, and a piston, said cable being reeved around a plurality of sheaves to form a rectangular loop, two sides of the loop extending across a runway to provide runway pendants, and the free ends of the loop from the other sides thereof being coupled to the end of the piston on the arrest side, a liquid filled elongated tube mounted on support members adjacent a longitudinal side of the runway, means for mounting said piston for sliding movement in the tube through the stationary fluid therein, and retractable and projectable cable support means under said pendants adapted to raise and lower the same with respect to the runway surface.

4. The aircraft arresting means described in claim 3, wherein said support means each include an air cylinder and a piston, said cylinders being connected to a header connecting with each cylinder in series, an air compressor connected to the header, and a multiple valve control for directing air under pressure from the compressor to one side or the other of the piston in a respective air cylinder for raising or lowering the said cable support means.

5. The aircraft arresting means described in claim 3, wherein the said elongated tube has a tapered bore calculated in proportion to predetermined deceleration loads imparted to the piston from aircraft engaging one of said pendants during an arrest, and said piston being provided with guide arms outwardly biased by spring means from the piston body into contact with the bore of the said tube.

6. An arresting engine for a mobile object located adjacent a surface comprising an elongated tapered tube having an arrest end, a solid element in the bore of the tube, a cable connected to the leading end of said element, said cable extending through the tube and out of the arrest end of the tube, and sheaves supported on the surface in predetermined spaced apart relation, said cable being reeved around the sheaves and across the surface in a loop formation.

7. The arresting engine described in claim 6, wherein the said tube is formed from a plurality of sections of tubular members having tapered bores, coupling means adapted to secure the said members together in substantially fluid tight relation, and a fluid pump adapted to maintain said tube filled with liquid, said liquid resisting the movement of said element when pulled by the cable through the tube bore toward the arrest end thereof.

8. A dual arrangement of arresting engines comprising spaced apart pairs of tapered arresting tubes filled with liquid, said respective pairs of tubes being tapered in the direction of arrest, a piston in each tube of each pair, and an arresting pendant connected to each piston of each pair of tubes, each of said respective pairs of tubes having an opposite aligned arrest direction, and said pendant for each pair of tubes being reeved across an aircraft runway or the like for arresting an aircraft in either aligned dirction said respective pendants of each respective pair of arrest tubes being longitudinally spaced apart, to thereby co-act selectively with the arrest appendage of an engaging aircraft.

9. An arresting engine for aircraft comprising a tube tapered in the direction of arrest, support means for said tube, said tube being substantially fluid tight and filled with liquid, an end sealing cap on each end of the tube formed with cable outlet bushings, an arrest element in the tube bore, a cable connected to the arrest end of the element and extending through said outlet bushings into an arrest loop formation, a liquid return sump over each of the end sealing caps lying transversely of said cable, and a pump with a feed line to said tube and a return line from each of said respective sumps.

References Cited in the file of this patent

UNITED STATES PATENTS

| 254,917 | Canet | Mar. 14, 1882 |
| 1,137,123 | Fernanzo | Apr. 27, 1915 |
| 1,315,320 | Le Mesurier | Sept. 9, 1919 |
| 2,474,858 | Nicholson | July 5, 1949 |

FOREIGN PATENTS

| 1,006,531 | France | Jan. 23, 1952 |
| 1,056,323 | France | Oct. 21, 1953 |